(12) United States Patent
Huang

(10) Patent No.: US 7,318,641 B2
(45) Date of Patent: Jan. 15, 2008

(54) PIVOTAL MECHANISM FOR SUSPENDING A LENS TO A SPECTACLE

(76) Inventor: Wen Tse Huang, P.O. Box 82-144, Taipei (TW)

( * ) Notice: Subject to any disclaimer, the term of this patent is extended or adjusted under 35 U.S.C. 154(b) by 1353 days.

(21) Appl. No.: 10/289,173

(22) Filed: Nov. 7, 2002

(65) Prior Publication Data

US 2006/0285069 A1    Dec. 21, 2006

(51) Int. Cl.
*G02C 9/00* (2006.01)
(52) U.S. Cl. .......................................... 351/47; 351/57
(58) Field of Classification Search ............... 351/47, 351/48, 57, 58, 44, 41, 158
See application file for complete search history.

(56) References Cited

U.S. PATENT DOCUMENTS

| | | | |
|---|---|---|---|
| 5,940,162 A * | 8/1999 | Wong | 351/47 |
| 6,474,810 B1 * | 11/2002 | Ng | 351/47 |
| 6,820,976 B2 * | 11/2004 | Ifergan | 351/47 |
| 7,033,018 B2 * | 4/2006 | Ifergan | 351/47 |

\* cited by examiner

*Primary Examiner*—Hung Xuan Dang
(74) *Attorney, Agent, or Firm*—Leong C. Lei

(57) ABSTRACT

A pivotal mechanism for suspending a lens to a spectacle is disclosed. The pivotal mechanism includes a front suspension lens module and a spectacle, characterized in that a frame support is provided to connect the two lens frame of the spectacle, the vertical face of the inner side of the two ends of the frame support is provided respectively with an engaging recess which can be circular arch shape or square or other shape, the engaging recess is mounted with engaging bead which is retractable; and the front suspension lens module includes a front suspension support having two ends for positioning front suspension lens, the bottom end face of the support is protruded to form two engaging protrusions having a shape matching the engaging recess of the spectacle, the protrusion face of the engaging protrusion is provided with an engaging hole; whereby the engaging protrusion is correspondingly inserted into the engaging recess such that the engaging bead engages with the engaging hole.

3 Claims, 3 Drawing Sheets

PIVOTAL MECHANISM FOR SUSPENDING A LENS TO A SPECTACLE

BACKGROUND OF THE INVENTION (a) Technical Field of the Invention

The present invention relates to a pivotal mechanism for suspending a lens to a spectacle, and in particular, a mechanism which pivots a lens onto the spectacle and facilitates removal of the lens when not in use.

(b) Description of the Prior Art

Taiwanese Utility Model Patent No. 145922 entitled "Combination Structure of a spectacle and frame thereof" discloses a lens mounting spectacle frame having elongated magnets on the two sides of the frame above spectacle support on the nose, and the top of the nose support is provided with a positioning hole corresponding to the lower center of the nose support having a positioning peg. These two components can be mounted to each other, providing positioning and avoiding sliding of the lens that suspends thereto. Even though there are magnets to attract the mounting of the lens and the positioning peg can secure the mounting by inserting the peg into the positioning hole, the area of the magnet is small and the attraction force is limited and mounting by magnet is only limited to attraction force in vertical direction. The positioning peg is easily dislocated from the positioning hole in the course of jogging, jumping or riding in a vehicle on a bumpy road. Further, after long period of use, the magnet may react with oxygen in the air, as a result, oxidization, demagnetization, decolorization, etc may occur. The connection between the frame and the lens may also be contaminated with drifts.

SUMMARY OF THE INVENTION

Accordingly, it is an object of the present invention to provide a pivotal mechanism for suspending a lens to a spectacle having a spectacle and a front suspension lens module, characterized in that a frame support is provided to connect the two lens frame of the spectacle, the vertical face of the inner side of the two ends of the frame support is provided respectively with an engaging recess which can be circular arch shape or square or other shape, the engaging recess is mounted with engaging bead which is retractable; and the front suspension lens module includes a front suspension support having two ends for positioning front suspension lens, the bottom end face of the support is protruded to form two engaging protrusions having a shape matching the engaging recess of the spectacle, the protrusion face of the engaging protrusion is provided with an engaging hole; whereby the engaging protrusion is correspondingly inserted into the engaging recess such that the engaging bead engages with the engaging hole.

Yet another object of the present invention is to provide a pivotal mechanism for suspending a lens to a spectacle, wherein the lens suspended on the spectacle frame can be easily removed.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
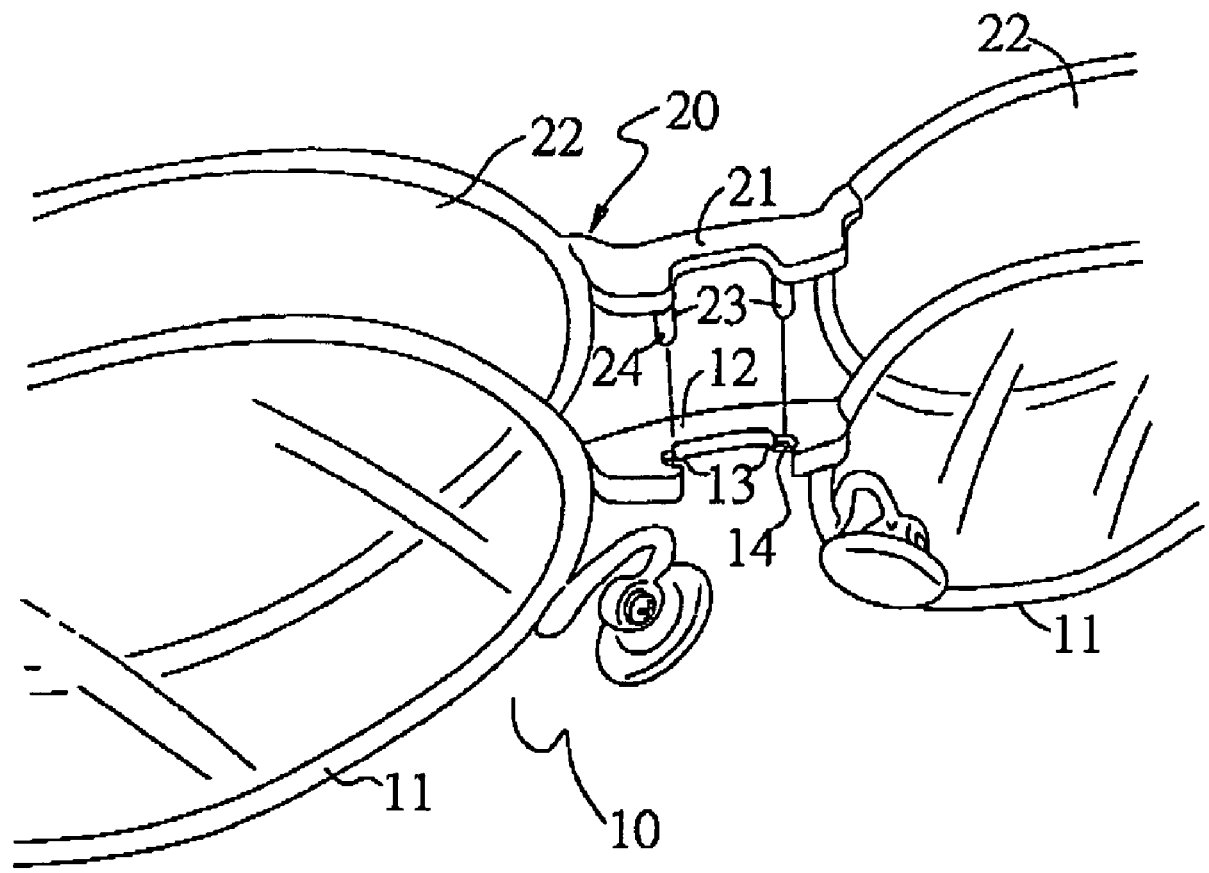
FIG. 1 is a perspective view of the present invention.

Referring to FIG. 1, there is shown a pivotal mechanism for suspending a lens to a spectacle, comprising a spectacle 10 and a lens suspension module 20.

Figure 2:
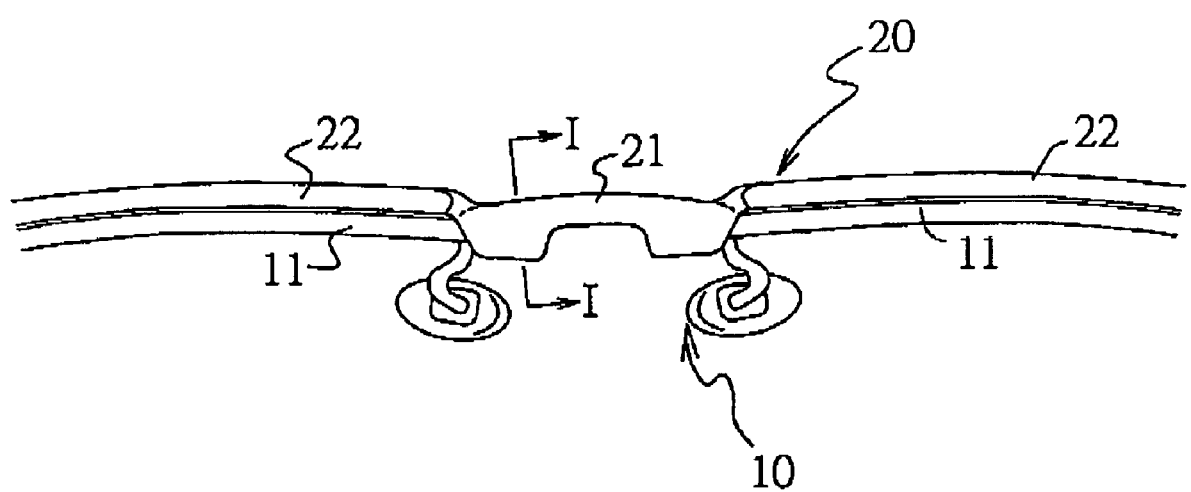
FIG. 2 is a top view of the present invention.
Figure 3:
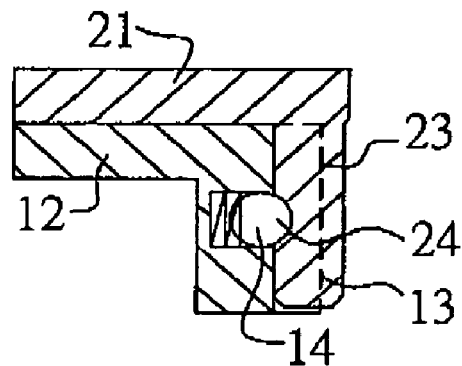
FIG. 3 is a sectional view along I-I of FIG. 2.
Figure 4:
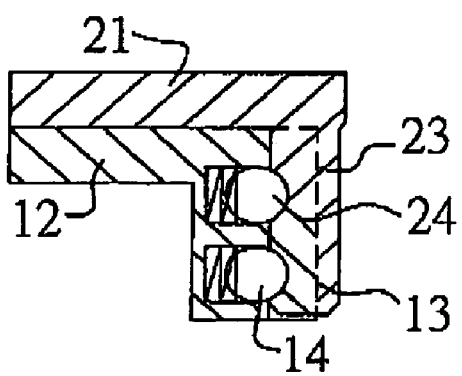
FIG. 4 is a sectional view of another preferred embodiment of the present invention.

As shown in FIGS. 2 and 3, a frame support 12 connects the spectacle 10. The inner side of the frame support 12 is provided with engaging recess 13 at the vertical face. The recess 13 is circular arch-shape, square shape or other shape. The internal of the engaging recess 13 is provided with retractable engaging beads 14. The engaging beads 14 can either one or more than one, as shown in FIG. 4.

Referring again to FIGS. 2 and 3, the two ends of the lens suspension frame 21 are provided with front suspension lens 22. The bottom end face of the front suspension support 21 is protruded to form two engaging protrusions 23. The engaging protrusions 23 match the shape of the recess 33 of the spectacle 10. The lateral face of the engaging protrusions 23 is provided with engaging hole 24. The engaging holes 24 have the same number with the engaging beads 14 and are arranged corresponding to the beads 14, as shown in FIG. 4.

Figure 5:
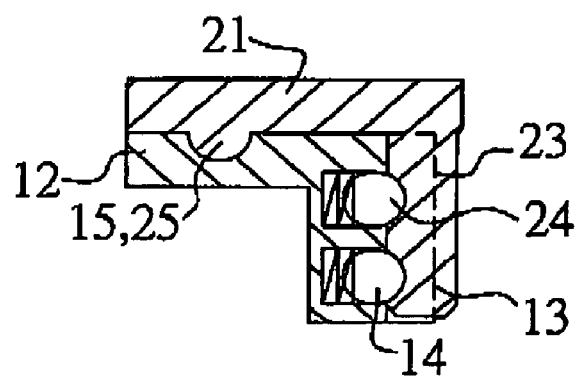
FIG. 5 is a sectional view showing the protruded block and the recess in accordance with the present invention.

Referring to FIG. 5, the top end face of the frame support 12 is provided with recessing hole 15 and the bottom end face of the front suspension frame 21 of the front lens suspension frame 21 of the front lens suspension module 20 is provided with protruded block 25 having a shape matching the recessing hole 15.

In operation, the engaging protrusion 23 at the two ends of the frame support 12 are correspondingly inserted into the engaging recess 13 at the two ends of the frame support 12, such that the engaging hole 24 is in engagement with the engaging bead 14 at the engaging recess 13. At the same time, the recessing hole 15 and the protruded block 25 are engaged with each other, and the two front suspension lenses 22 of the spectacle frame 11 are positioned at the correct position. Thus, in accordance with the present invention, the engaging protrusion 23 is used to mount with the engaging recess 13 such that the engaging bead 13 is in engagement with the engaging hole 24, and the front suspension lens module 20 can be pivotally suspended onto the frame support 12 of the spectacle 10. In particular, when the module 20 is pivotally suspended to the spectacle 10, the recessing hole 15 and the protruded block 25 are engaged with each other such that the spectacle 10 and the module 20 are fully secured to each other regardless of horizontal or vertical direction. Therefore an excellent positioning of the module 20 to the spectacle 10 is obtained. As a result, the spectacle 10 with the front suspension lens module 20 is wore by a wearer will not be dislocated even when the wearer performs jogging, sitting or riding a vehicle passing a bumpy road. The front suspension lens module 20 can be stably secured to the front lateral face of the frame 11 of the spectacle 10.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A pivotal mechanism for suspending a lens to a spectacle having a spectacle and a front suspension lens module, wherein a frame support is provided to connect the two lens frame of the spectacle, the vertical face of the inner side of the two ends of the frame support is provided respectively with an engaging recess which can be circular arch shape or square or other shape, the engaging recess is mounted with engaging bead which is retractable; and the front suspension lens module includes a front suspension support having two ends for positioning front suspension lens, the bottom end face of the support is protruded to form two engaging protrusions having a shape matching the engaging recess of the spectacle, the protrusion face of the engaging protrusion is provided with an engaging hole; whereby the engaging protrusion is correspondingly inserted into the engaging recess such that the engaging bead engages with the engaging hole.

2. The pivotal mechanism of claim 1, wherein the engaging bead is mounted as one or two and the number of engaging hole is corresponding to the number of the engaging bead.

3. The pivotal mechanism of claim 1, wherein the end face of the frame support is provided with recessing hole and the bottom end face of the front suspension support is provided with protruded block which is corresponding and matching the recessing hole, thereby when the lens module is suspended onto the spectacle, the recessing hole and the protruded block are in engagement with each other so that a firm mounting is obtained.

* * * * *